United States Patent [19]

Garabedian

[11] Patent Number: 5,572,792
[45] Date of Patent: Nov. 12, 1996

[54] BARBECUE UTENSIL SET

[76] Inventor: Thomas Garabedian, 4728 Robinhood Trail, Sarasota, Fla. 34232

[21] Appl. No.: 259,017

[22] Filed: Jun. 13, 1994

[51] Int. Cl.⁶ .................................................. B25F 1/00
[52] U.S. Cl. ........................ 30/142; 206/315.3; D7/669
[58] Field of Search ............................ 30/142, 147, 148, 30/150, 322; 206/315.3, 315.5; 446/479, 76; D21/214; D7/683, 684, 689, 669; D3/255

[56] References Cited

U.S. PATENT DOCUMENTS

| | | | |
|---|---|---|---|
| D. 206,888 | 2/1967 | Blitz | D21/214 |
| D. 246,003 | 10/1977 | Shimada | D21/214 |
| D. 273,075 | 3/1984 | Hayden | D7/683 |
| 2,165,665 | 7/1939 | Thompson | 206/315.5 |

OTHER PUBLICATIONS

"Barbecue Utensil Set" (item 5) shown on p. 62 of Better Homes & Gardens, Jul. 1947.
"Bar-B-Q Brush Set" shown on p. 16 of Camalier & Buckley, 1957.
"Den Caddy" shown on p. 28 of Austad's, spring 1988.
"Golf Bag" shown on p. 27 of Hammacher Schlemmer Holiday, 1990.

*Primary Examiner*—Hwei-Siu Payer
*Attorney, Agent, or Firm*—Charles J. Prescott

[57] ABSTRACT

A barbecue utensil set having shanks and handles configured to provide the look and feel of sporting implements such as a golf club, tennis racket, baseball bat and the like. A carryall in the form of a miniature golf bag having an overall size and length for receiving and storing the barbecue utensil set is also provided.

2 Claims, 2 Drawing Sheets

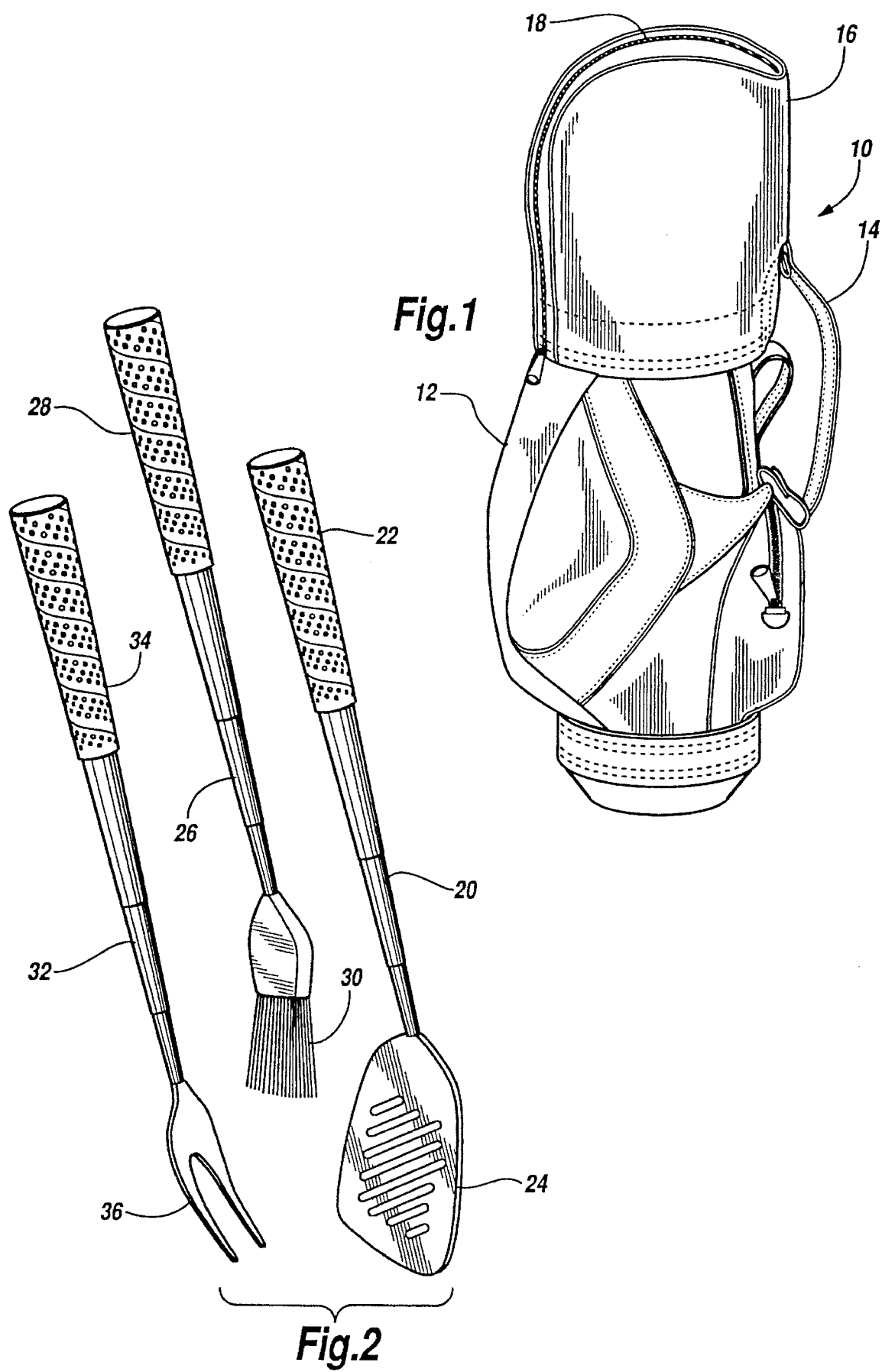

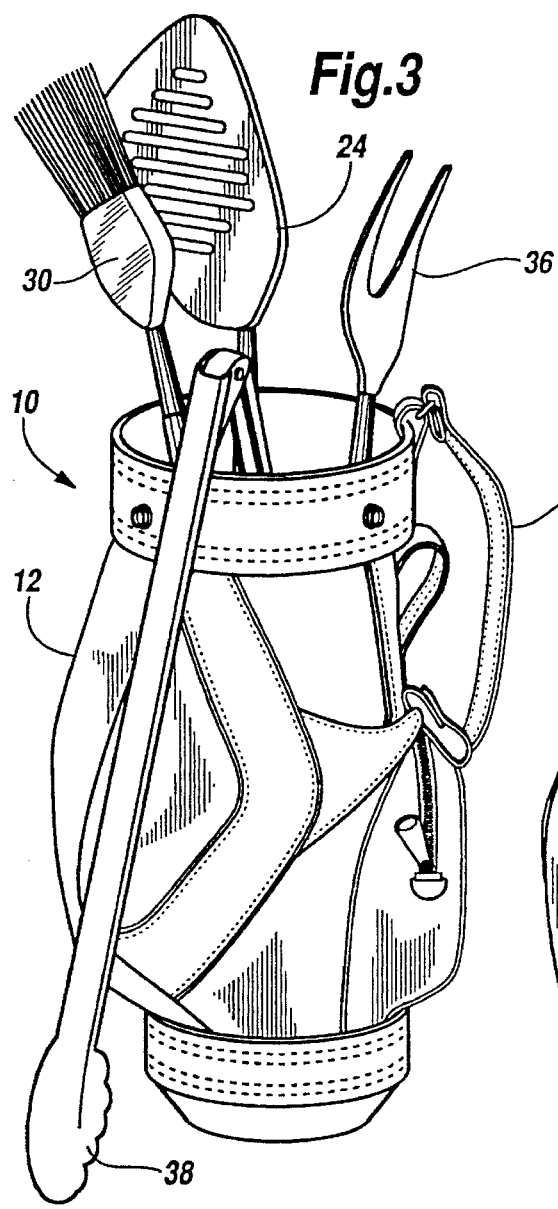
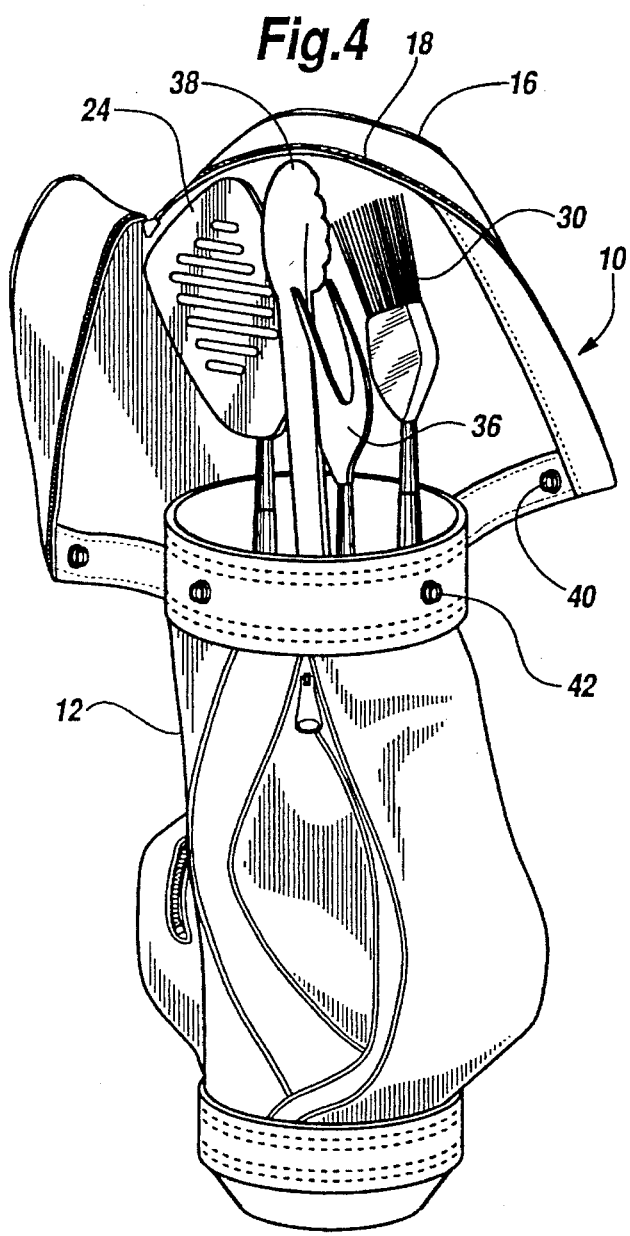

BARBECUE UTENSIL SET

BACKGROUND OF THE INVENTION

1. Scope of Invention

This invention relates generally to barbecue utensils, and more particularly to barbecue utensils having a uniquely configured handle and shank which provide the look and feel of a sports implement such as a golf club.

2. Prior Art

Barbecue utensils are well known. Such utensils are normally configured with elongated handles and/or shanks so that the user may manipulate the instrument portion such as a spatula, a barbecue sauce brush and a fork from a distance sufficient to avoid exposure to excessive heat from the barbecue grill itself.

One such device is disclosed in U.S. Pat. No. 3,906,632 invented by Obbenheimer directed to a dual function cooking and barbecuing utensil wherein the shank is extendable for use at a barbecue grill.

In U.S. Pat. No. 3,148,907, Peterson teaches a hot dog barbecue fork having a unique formed wire structure. A formable anatomical handle invented by Camacho is disclosed in U.S. Pat. No. 4,698,893 teaching the mixture of five components which amalgamate to form a custom grip for fishing rods and other instruments as well.

Applicant is also aware of the following U.S. Design patents which teach uniquely ornamentally configured barbecue utensils:

Tucker et al. U.S. Pat. No. Des. 299,997

Tucker et al. U.S. Pat. No. Des. 298,792

Bouilhet U.S. Pat. No. Des. 307,096

Gomez et al. U.S. Pat. No. Des. 332,554

Hayden U.S. Pat. No. Des. 273,075

The present invention provides a set of barbecue utensils having uniquely configured shanks and handles to provide the appearance and feel of a sports implement such as a golf club, a tennis racket, a baseball bat handle and the like and in combination with a miniature golf-club bag for decorative carrying and storage of these utensils in the corresponding configuration of shank and handle.

BRIEF SUMMARY OF THE INVENTION

This invention is directed to a barbecue utensil set having shanks and handles configured to provide the look and feel of sporting implements such as a golf club, tennis racket, baseball bat and the like. A carryall in the form of a miniature golf bag having an overall size and length for receiving and storing the barbecue utensil set is also provided.

It is therefore an object of this invention to provide a barbecue utensil set having shanks and handles for grip areas configured to provide the appearance and handling feel of a sports implement.

It is another object of this invention to provide a barbecue utensil set configured to simulate the appearance and feel of a golf club.

It is another object of this invention to provide the combination of barbecue utensils having the grip and shank of a golf club and a miniature golf club bag for decorative storage and easy portability of the utensil set.

In accordance with these and other objects which will become apparent hereinafter, the instant invention will now be described with reference to the accompanying drawings.

BRIEF DESCRIPTION OF THE DRAWINGS

FIG. 1 is a perspective view of the preferred embodiment of the combination.

FIG. 2 is a perspective view of the preferred embodiment of the barbecue utensil set.

FIG. 3 is a perspective view of FIG. 1 with the top cover removed.

FIG. 4 is a perspective view of FIG. 3 with the top cover partially removed.

DETAILED DESCRIPTION OF THE INVENTION

Referring now to the drawings, the invention in combination is shown generally at numeral 10 in FIGS. 1, 3 and 4. This combination includes a carrying case 12 in the form of a miniature golf bag having a carrying handle 14 and a removable top cover 16 and the barbecue utensils shown in FIG. 2.

In FIG. 2, the preferred combination of barbecue utensils is there shown having instrumental portions as a spatula 24, a barbecue brush 30 and a meat fork 36. The spatula 24 includes an elongated tapering shaft 20 having a handle 22 disposed at its distal end. The tapering shaft 20 and handle 22 are structured to emulate a golf club shaft and golf club grip, correspondingly.

Likewise, barbecue brush 30 includes a tapered slender shaft 26 and a handle 28 disposed at its distal end. This shaft 26 and handle 28 ar structured to appear identical to a golf club shaft and golf club grip therefor, respectively.

The meat fork 36 extends at its mid portion to tapered shaft 32 and terminating at its distal end at handle 34. Here again, shaft 32 and grip 34 are identically structured to represent a golf club shaft or shank and a rubberized or leather-wrapped golf grip, respectively.

In FIG. 3, the top cover 16 has been removed by disengagement of zipper 18 and mating two-part snaps 40/42 as seen in FIG. 4. The spatula 24, brush 30 and fork 36 are sized in overall length with respect to the golf bag 12 so as to be exposed for easy viewing and selection with the cover 16 either open or removed. The set of utensils may include a set of conventional barbecue tongs 38 which are not intended to be a primary element of this invention as tongs generally do not include a handle or grip portion.

Again, the miniature golf bag 12 with removable cover 16 is sized in overall length to be generally equal to the length of the shaft and handle portion of each of the utensils so that the instrumental portions 24, 30, and 36 are viewable when the cover 16 is partially opened in FIG. 4 or totally removed as shown in FIG. 3. When the combination invention is in the stored and carriable configuration of FIG. 1, the attractiveness of the miniature golf bag 12 and the easy portability thereof is highly appreciated.

Although the barbecue utensils shown in FIG. 2 only depict one sports implement as in the form of a golf club, nonetheless this invention is intended to be equally adaptive to and embrace other sports implements such as the shank and grip of a tennis racket and the handle and mid portion of a baseball bat and the like.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. In combination a set of novelty barbecue utensils and a carryall therefor comprising:

a spatula, a brush and a fork each having an instrumental portion, a shank and a handle, each said shank and handle configured as a miniature golf club shank and grip, respectively;

a miniature golf club bag sized to enclose and carry said spatula, said brush and said fork with each said instrumental portion extending above an open upper end of said golf club bag;

a removable upper end enclosure connectable to said open upper end for preventing inadvertent removal of said utensils from said miniature golf club bag.

2. A set of novelty barbecue utensils and a carryall as set forth in claim 1, wherein:

said upper end enclosure includes zipper means for opening said upper end enclosure providing access to each of said utensils without removing said upper end enclosure from said golf club bag.

\* \* \* \* \*